United States Patent Office 2,957,015
Patented Oct. 18, 1960

2,957,015

SEPARATION OF VINYL ESTERS OF FATTY ACIDS FROM THE CORRESPONDING FATTY ACIDS

Hans H. Kuhn, Belmont, and Elmar K. Wilip, Cambridge, Mass., assignors to W. R. Grace & Co., Cambridge, Mass., a corporation of Connecticut No Drawing. Filed Sept. 14, 1959, Ser. No. 839,604

6 Claims. (Cl. 260—410.9)

This invention relates to the recovery of the vinyl esters of certain fatty acids from mixtures of the esters with the acids from which they are derived.

Vinyl esters are frequently produced by the vinyl interchange reaction, in which a carboxylic acid is reacted with the vinyl ester of a lower fatty acid, usually vinyl acetate, in the presence of a catalyst. The separation of the vinyl ester so produced from unreacted carboxylic acid is one of the more difficult aspects of such a process, and various methods have been suggested for making this separation.

The separation of vinyl esters of saturated fatty acids from the corresponding acids has ordinarily been accomplished by the addition of sodium hydroxide to the mixture of vinyl ester and unreacted fatty acid, with the precipitation of a fatty acid soap. In one such process, the crude mixture is dissolved in a solvent such as acetone and after the addition of the sodium hydroxide, the soap is removed by filtration. The vinyl ester is later recovered from the solvent by crystallization. In another process, the sodium hydroxide addition is carried out at a temperature at which the mixture of vinyl ester and fatty acid is liquid, and the precipitated soap is removed from the vinyl ester by filtration. The latter process, while it has the advantage of eliminating the solution step, is possible only when the amount of acid in the ester-acid mixture is relatively low, because the soap precipitates are voluminous and separation from the undiluted vinyl ester is rather difficult. The soaps of fatty acids having 10 or more carbon atoms in their structure are soft and curdy and tend to clog the filters and make the filtration step particularly time-consuming and difficult. Because the soap precipitate carries down with it substantial quantities of vinyl ester, careful washing of the precipitate with a solvent for the ester is also necessary.

The operations involved in the separation of a vinyl ester from a fatty acid soap are time-consuming and therefore expensive. The above-described processes have the additional limitation that vinyl esters are subject to hydrolysis by the sodium hydroxide. Unless the addition is handled with great care, serious losses of the vinyl ester product may result. If it is desired to recover the unreacted acid and make it available for the continued production of vinyl ester, furthermore, the acid must be regenerated by treatment of the soap with a strong acid such as sulfuric acid.

The object of our invention, therefore, is a new method by which vinyl esters of fatty acids, particularly those containing 10 or more carbon atoms, may be recovered in a highly purified condition from mixtures with the corresponding acids. More particularly, our invention has for its object the development of a method of separation which does not involve the addition of sodium hydroxide, which may be carried out quickly and easily, and which yields the fatty acid in a pure state suitable for immediate re-use in the vinyl interchange reaction.

Distillation of vinyl esters at normal temperatures and pressures leads to decomposition of the vinyl esters if even a small amount of unreacted acid is present. Under conditions of drastically reduced temperature and pressure, coupled with extremely short residence time, such as found in the so-called molecular stills, the presence of unreacted acid does not cause noticeable decomposition of the vinyl ester. The amount of pure vinyl ester product which may be recovered by distilling such a mixture in a molecular still is limited, however, by the amount of unreacted acid in the mixture. If unreacted acid is present in too large amounts, only a very small fraction of high purity vinyl ester may be recovered, after which the acid distills over in such large quantities that the resultant product is unacceptable for most industrial uses. It is desirable from an economic point of view to be able to recover 75% to 80% of the vinyl ester present in an ester-acid mixture by a single distillation. The amount of unreacted fatty acid in the product should not exceed 2% and should preferably be kept to a level of not more than about 1%. We have found that if the level of unreacted fatty acid in the vinyl ester-fatty acid mixture is below about 5%, distillation of the mixture in a molecular still may be carried out successfully, with about 75% to 80% of the vinyl ester being recovered as a highly purified, low acid fraction. If the level of acid in the mixture is as high as 10%, less than 25% of the vinyl ester can be recovered before the acid content of the product rises to above 2%, and if the distillation is carried on until 75% of the vinyl ester has been recovered from the original mixture, the product will have an acid content of about 5%. When mixtures of even higher acid content, for example 25% unreacted acid, are distilled, no acceptable product can be obtained, the first fraction of vinyl ester collected containing about 4% acid.

We have discovered a method of separating a vinyl ester from a mixture with its corresponding fatty acid by first reducing the level of fatty acid in the mixture to about 5% by weight or less, and then recovering the vinyl ester by distilling the mixture in a molecular still. The level of fatty acid in the mixture is reduced by cooling the mixture to a temperature at which a substantial proportion of fatty acid crystallizes out but the vinyl ester remains liquid, and then removing the crystallized fatty acid by filtration. Our new method is rapid, simply carried out and economical, and makes possible the recovery of vinyl esters of a high degree of purity.

Our invention will be more readily understood by reference to the following examples. The vinyl ester-fatty acid mixtures used in the examples were obtained as a result of a vinyl interchange reaction between a fatty acid and an excess of vinyl acetate in the presence of a mercuric sulfate catalyst. After completion of the interchange reaction the excess vinyl acetate and the acetic acid formed in the reaction were removed from the reaction mixture by distillation, leaving a mixture which consisted mainly of unreacted acid and the vinyl ester product. The percentages shown in the examples are by weight.

*Example I*

1140 grams of a mixture of vinyl laurate and lauric acid having an acid content of 6% by weight was placed in a freezer at a temperature of 4° C. After the temperature of the mixture had dropped to about 4° C., 15 grams of the white crystalline precipitate, pure lauric acid, was removed by filtration. The filtrate, which contained about 4.7% acid, was then distilled in a molecular still at a pressure of about 15 microns and a temperature of about 60° C. The distillate was analyzed from time to time and distillation was discontinued when the level of fatty acid in the distillate began to approach 1%. 836 grams of vinyl laurate containing less than 1% acid, or about 77% of the vinyl ester present in the filtrate, was recovered in a single distillation operation.

The residue of 245 grams, which contained about 18% of acid, was cooled to 4° C., and the 37 grams of lauric acid which crystallized from the solution was removed by filtration. The filtrate, which now contained about 4.3% of acid, was distilled under the same conditions as described above and 140 grams of high purity vinyl laurate was recovered.

*Example II*

A mixture of lauric acid and myristic acid was converted to vinyl laurate and vinyl myristinate by the vinyl interchange reaction. After removal of the excess vinyl acetate and the acetic acid formed in the reaction, an acid-ester mixture containing 5.1% of the mixed acids and 94.9% of mixed vinyl esters remained. The mixture was cooled to 4° C., and the crystallized fatty acids were removed by filtration. The filtrate, which contained 3.2% of fatty acids, was then subjected to distillation under the conditions shown in Example I. 90% of the vinyl esters contained in the original mixture was obtained as a high quality product containing less than 1% fatty acid. The residue, which was found to contain about 30% acid, could be further purified by crystallization and distillation if desired.

The above examples illustrate the way in which high quality vinyl esters can be obtained by successive crystallization and distillation steps. Alternatively, if several batches of vinyl ester were being made concurrently, the filtrates from the crystallization steps could be combined with other acid-ester mixtures having similar low acid levels, and a single distillation of the larger quantity of acid-ester mixture could be carried out.

It is possible, also, if the conversion of fatty acid to vinyl ester in the interchange reaction is very high, for example above 95%, that the acid-ester mixture derived from the reaction can be distilled without any pre-treatment to reduce the acid level, as shown in Example III. The distillation residue may then be cooled to precipitate fatty acid, filtered, and distilled to recover a further quantity of vinyl ester in the manner described above. This procedure has the advantage that it greatly reduces the volume of material which is to be filtered.

*Example III*

1000 grams of a mixture of vinyl laurate and lauric acid having an acid content of 4% by weight was distilled in a molecular still at a pressure of about 15 microns and a temperature of about 60° C. Distillation was discontinued when the level of acid in the distillate began to approach 1%. 800 grams of highly purified vinyl laurate or about 83% of the vinyl ester present in the original acid-ester mixture was recovered.

The distillation residue, which weighed 190 grams and contained 16% of lauric acid was then cooled to about 2° C. and the 21 grams of acid which crystallized from the solution was removed by filtration. The filtrate, which now contained 5% of acid, was distilled under the same conditions as the original acid-ester mixture, and a further quantity of 130 grams of high purity vinyl laurate was recovered.

It is sometimes advantageous, particularly when large amounts of inorganic material and other impurities are present, due to the use of technical grades of fatty acids in the vinyl interchange reaction, to carry out an initial complete distillation of the acid-ester mixture in the molecular still, and to recover the purified mixture of acid and vinyl ester. The vinyl ester may then be recovered from the distillate by the process shown in the above examples. The advantages of this procedure are that the fatty acid crystallizes more readily from a pure mixture than it does in the presence of large amounts of impurities, and that a more highly purified vinyl ester product may be obtained in this way.

The above procedures may also be applied to a continuous process for producing vinyl esters by the vinyl interchange reaction, the distillation residues being cooled and filtered and the filtrates being recycled for further distillation.

One of the chief advantages of the process of our invention is that it eliminates the necessity for adding sodium hydroxide to the acid-ester mixture. The fatty acid precipitate is crystalline and is therefore easily separated from the surrounding liquid by filtration, with none of the difficulties which are inherent in the filtration of fatty acid soaps. The crystallized fatty acid is recovered in a pure state, furthermore, and is immediately available for re-use in the vinyl interchange reaction. An additional advantage is present when the process of Example III is followed, since the volume of material to be filtered is greatly reduced.

We have found that the acid-ester mixture must be cooled to a temperature well below the melting point of the fatty acid in order to precipitate any substantial quantity of the fatty acid contained in the mixture. Because the acids are soluble to some degree in the vinyl esters, it follows that the lower the temperature to which the mixture is subjected, the larger will be the quantity of acid which is crystallized out. The vinyl esters have melting points considerably below the melting points of the corresponding fatty acids. Accordingly, in carrying out our invention, the acid-ester mixtures should be cooled to as low a temperature as possible without causing crystallization of the vinyl ester to occur. We have found that successful results may be obtained when the mixtures are cooled to a temperature about 10° C. above the melting point of the vinyl ester. Even lower temperatures are preferred, and we have found that the mixtures may be cooled to within about 2° C. of the melting point of the vinyl ester without crystallization of the ester. Below this temperature, a clean separation can not be made, as the precipitate will contain both fatty acid and vinyl ester.

Our invention is directed particularly to the separation of fatty acids containing 10 or more carbon atoms from the corresponding vinyl esters. We have found, however, that the separation may be carried out effectively only if there is a substantial difference between the melting points of the fatty acid and its vinyl ester. The melting points of the fatty acids containing from 10 to 14 carbon atoms are at least 40° C. higher than the melting points of their corresponding vinyl esters. As the chain length of the acid increases, this difference becomes gradually less until a point is reached where the melting points are so close together that effective separation by our new process is no longer possible. We have found that successful separation may be made with acids containing up to 20 carbon atoms. Accordingly, the process of our invention is preferably carried out with fatty acids containing from 10 to 20 carbon atoms, i.e. capric, undecanoic, lauric, tridecanoic, myristic, pentadecanoic, palmitic, heptadecanoic, stearic, nonadecanoic and arachidic acids.

The above-described process provides a simple, effective and rapid means for separating mixtures of fatty acids and their vinyl esters, and for recovering in a highly purified condition both the vinyl esters and the fatty acids.

We claim:

1. A process for separating a vinyl ester of a saturated fatty acid from a mixture of the vinyl ester and the said fatty acid which includes cooling the said mixture to a temperature between about 2° C. and about 10° C. above the melting point of the vinyl ester in order to precipitate fatty acid therefrom, filtering the mixture to remove the precipitated fatty acid, distilling the filtrate in a molecular still, and thereby recovering vinyl ester of a high degree of purity.

2. The process of claim 1 in which the said saturated fatty acid contains from 10 to 20 carbon atoms.

3. A process for separating vinyl laurate from a mixture of vinyl laurate and lauric acid which includes cooling the said mixture to about 4° C. in order to precipitate lauric acid therefrom, filtering the mixture to remove the precipitated lauric acid, distilling the filtrate in a molecular still, and thereby recovering vinyl laurate of a high degree of purity.

4. In a process for producing a vinyl ester by the vinyl interchange reaction between vinyl acetate and a saturated fatty acid containing from 10 to 20 carbon atoms, and the separation of the vinyl ester so formed from the unreacted fatty acid, the steps of cooling the mixture of vinyl ester and unreacted fatty acid to a temperature between about 2° C. and about 10° C. above the melting point of the vinyl ester in order to precipitate fatty acid therefrom, filtering the mixture to remove the precipitated fatty acid, distilling the filtrate in a molecular still in order to recover vinyl ester, continuing the distillation as long as the vinyl ester so recovered contains not more than about 2% by weight of fatty acid, and subjecting the distillation residue to the above-described operations of cooling, filtration and distillation.

5. The process of claim 3 in which the unreacted fatty acid which is recovered in the filtration steps is re-used in the vinyl interchange reaction.

6. In a process for producing a vinyl ester by the vinyl interchange reaction between vinyl acetate and a saturated fatty acid containing from 10 to 20 carbon atoms and the separation of the vinyl ester so formed from the unreacted fatty acid, wherein the amount of unreacted fatty acid is less than about 5% of the weight of the fatty acid-vinyl ester mixture, the steps of distilling the said fatty acid-vinyl ester mixture in a molecular still in order to recover vinyl ester, continuing the distillation as long as the vinyl ester recovered contains not more than about 2% by weight of fatty acid, cooling the distillation residue to a temperature between about 2° C. and about 10° C. above the melting point of the vinyl ester in order to precipitate fatty acid therefrom, filtering the mixture to remove the precipitated fatty acid, and distilling the filtrate in a molecular still in order to recover a further quantity of vinyl ester.

References Cited in the file of this patent

UNITED STATES PATENTS

| | | |
|---|---|---|
| 2,042,221 | Groll et al. | May 22, 1936 |
| 2,543,055 | Pool et al. | May 10, 1944 |
| 2,756,222 | Swern et al. | July 24, 1956 |
| 2,838,480 | Swern et al. | June 10, 1958 |